(12) United States Patent
Okubo et al.

(10) Patent No.: US 7,216,082 B2
(45) Date of Patent: May 8, 2007

(54) ACTION TEACHING APPARATUS AND ACTION TEACHING METHOD FOR ROBOT SYSTEM, AND STORAGE MEDIUM

(75) Inventors: Atsushi Okubo, Tokyo (JP); Gabriel Costa, Tokyo (JP); Kenta Kawamoto, Tokyo (JP); Rika Horinaka, Tochigi (JP); Masaki Fukuchi, Tokyo (JP); Masahiro Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 10/296,269

(22) PCT Filed: Mar. 26, 2002

(86) PCT No.: PCT/JP02/02890

§ 371 (c)(1),
(2), (4) Date: Jun. 2, 2003

(87) PCT Pub. No.: WO02/076686

PCT Pub. Date: Oct. 3, 2002

(65) Prior Publication Data
US 2003/0187653 A1 Oct. 2, 2003

(30) Foreign Application Priority Data
Mar. 27, 2001 (JP) .............................. 2001-91030

(51) Int. Cl.
*G10L 15/22* (2006.01)
(52) U.S. Cl. ..................................... 704/275
(58) Field of Classification Search ............. None
See application file for complete search history.

(56) References Cited

U.S. PATENT DOCUMENTS
4,896,357 A 1/1990 Hatano et al.

FOREIGN PATENT DOCUMENTS
| JP | 63-28586 | 2/1988 |
| JP | 2776477 | 7/1998 |
| JP | 2000-153478 | 6/2000 |
| JP | 2000-153479 | 6/2000 |
| WO | WO 00/41853 | 7/2000 |

*Primary Examiner*—Susan McFadden
(74) *Attorney, Agent, or Firm*—Frommer Lawrence & Haug LLP; William S. Frommer; Thomas F. Presson

(57) ABSTRACT

A robot system includes a speech recognition unit for converting speech information into text information, and a database retrieval unit for extracting a keyword included in the text information from a database. By designating a plurality of basic actions on a speech basis, and storing an action record, a combined action formed by combining the plurality of basic actions in time-series order can be named as a new action only in voice-based interaction. A user can designate complicated continuous actions by using only one word, and can easily have a conversation with the robot.

11 Claims, 6 Drawing Sheets

FIG. 7

```
TURN TO THE LEFT        5 SECONDS
WALK                    30 SECONDS
REST                    5 MINUTES
WALK                    3 MINUTES 15 SECONDS
RAISE THE RIGHT HAND    10 SECONDS
REST                    1 MINUTE 50 SECONDS
WALK                    10 SECONDS
TURN TO THE RIGHT       2 SECONDS
WALK                    3 SECONDS
TURN TO THE RIGHT       2 SECONDS
WALK                    3 SECONDS
TURN TO THE RIGHT       2 SECONDS
WALK                    3 SECONDS
TURN TO THE RIGHT       2 SECONDS
WALK                    3 SECONDS
REST                    3 MINUTES
```

ACTION-RECORD DATABASE 107

FIG. 8

```
TURN TO THE RIGHT
    WALK                  10 SECONDS
    TURN TO THE RIGHT     2 SECONDS
    WALK                  3 SECONDS
    TURN TO THE RIGHT     2 SECONDS
    WALK                  3 SECONDS
    TURN TO THE RIGHT     2 SECONDS
    WALK                  3 SECONDS
    TURN TO THE RIGHT     2 SECONDS
    WALK                  3 SECONDS
HAND
    RAISE THE RIGHT HAND  10 SECONDS
REFILL
    RAISE THE LEFT HAND   10 SECONDS
```

COMBINED-ACTION DATABASE 106

ACTION TEACHING APPARATUS AND ACTION TEACHING METHOD FOR ROBOT SYSTEM, AND STORAGE MEDIUM

This application is a 371 of PCT/JP02/02890 Mar. 26, 2002.

TECHNICAL FIELD

The present invention relates to action teaching apparatuses and action teaching methods for robot apparatuses, and to storage media, and in particular, to an action teaching apparatus and action teaching method for a robot apparatus that acts in accordance with commands input by voice-based interaction, and to a storage medium.

More specifically, the present invention relates to an action teaching apparatus and action teaching method for a robot apparatus that executes particular actions in response to particular commands, and to a storage medium, and in particular, to an action teaching apparatus and action teaching method for a robot apparatus that executes a combined action formed by combining, in time-series order, a plurality of actions to which commands are assigned, and to a storage medium.

BACKGROUND ART

Conventionally, many proposals and developments have been made regarding walking robot apparatuses and articulated robots that perform actions in response to commands from a user and surrounding environments, or animations using characters that perform actions by computer graphics (CG), etc. These robot apparatuses or animations (hereinafter collectively referred to also as "robot apparatuses or the like") perform continuous actions in response to commands from users.

By way of example, a robot apparatus that is similar in shape and structure to a four-legged animal such as a dog, that is, a "pet robot", takes a DOWN posture in response to the command "DOWN" (e.g., a voice input) from a user, and performs a "HAND" action when the user puts out his or her hand in front of the mouth of the robot.

It is preferable that the robot apparatuses or the like which imitate an actual creature, such as a dog or a human, be similar in action and emotion to real creatures as much as possible. Also, it is preferable for the robot apparatus or the like not only to perform a predetermined action based on a command from the user or the external environment, but also to perform an autonomous action similarly to a real creature. This is because the user becomes bored with repeated actions of the robot apparatus or the like which are unrealistic and because the ultimate object of developing the robot apparatus or the like, that is, symbiosis with the human under the same environment, cannot be achieved.

Recent intelligent robot apparatuses or the like are provided with functions such as speech input/output, speech recognition, and speech synthesis, and can have a conversation/interaction with a user on a speech basis. Also, in this conversation/speech, it is preferable for the robot apparatus not only to perform a predetermined action based on a command from the user or the external environment, but also to perform an autonomous action similarly to a real creature.

Among robot apparatuses or the like which have a speech recognition function of the related art, most execute a specific preprogrammed action when a specific preset command is spoken.

In this case, words enabling interaction with the robot apparatus or the like are limited. Thus, in other words, there is no expansibility in the interaction with the robot apparatus or the like and in the actions which can be ordered.

In addition, when the robot apparatus or the like is controlled to perform a combined action, in time-series order, by combining separate actions assigned to commands, it is necessary to order the robot with a command corresponding to each action, which is inconvenient, and therefore it is difficult to control the robot apparatus or the like to perform the desired combined action.

Also, in order to program a combined action, several motion-editor-type programming tools have already been proposed (see Japanese Patent Application No. 2000-175159, Japanese Patent Application No. 2000-295719, and Japanese Patent Application No. 2000-295719, which have already been assigned to the present Applicant). However, in order to fully utilize the above type of tool, at least a certain level of computer-related knowledge is required. In other words, this prevents widespread use of robot apparatuses or the like since the range of users is limited.

DISCLOSURE OF INVENTION

It is an object of the present invention to provide an action teaching apparatus and action teaching method for a superior robot apparatus that can execute specific actions in response to specific commands when the commands are spoken, and a storage medium.

It is a further object of the present invention to provide an action teaching apparatus and action teaching method for a superior robot apparatus that can execute a combined action formed by, in time-series order, combining a plurality of actions to which commands are assigned, and a storage medium.

It is a further object of the present invention to provide an action teaching apparatus and action teaching method for a superior robot apparatus in which, only by voice-based interaction, a combined action formed by combining a plurality of basic actions in time-series order can be named as a new action, and a storage medium.

The present invention is made in view of the above problems, and is, in a first aspect thereof, an action teaching apparatus for teaching actions to a robot apparatus by voice-based interaction, the action teaching apparatus comprising:

speech input means from which the content of a user's speech is input in audio form;

speech recognition means which recognizes the input speech as text information;

action control means which moves a body in accordance with a recognized command;

an action database which stores action patterns in association with commands;

action-record storage means which stores an action record in which a plurality of action patterns are arranged in time-series order in accordance with the order of execution; and action registering means which separates a portion of the action record therefrom, and registers the portion in said action database, with a new command assigned to the portion.

An action teaching apparatus for a robot apparatus, according to the first aspect of the present invention, includes a speech recognition function for converting audio information into text information, and a database retrieval function for extracting a keyword from the text information obtained by the conversion. By designating a plurality of basic actions on a speech basis, and storing an action record, the action teaching apparatus uses only voice-based interaction to enable naming, as a new action, a combined action formed by combining the plurality of basic actions in time-series order.

Accordingly, the user can designate complicated continuous actions by using only one word, and this facilitates conversation with the robot.

Also, the user can designate complicated continuous actions by using only one word. Thus, the operability of the robot is greatly increased.

Also, even an ordinary user can teach actions to the robot apparatus by using only speech. In other words, computer-related knowledge is not required to teach actions to the robot apparatus, so that the operability can be increased and the range of users can be expanded.

Also, the user can use his or her favorite word to command an action by speech. This increases the operability, so that increased familiarity with the robot apparatus can enhance entertainment.

Here, based on the content of the speech input through said speech input means by the user, the action registering means may set the new command.

Also, the action registering means may separate the portion of the action record by using, as a trigger, either a specific input such as a demonstrative pronoun or a pointer through said speech input means, or a state of rest.

Also, when the robot apparatus can be autonomically driven, in response to a user's instruction through the speech input means, the action registering means may follow the action record backward in time-series order and may perform action separation.

In addition, the present invention is, in a second aspect thereof, an action teaching apparatus for teaching actions to a robot apparatus by voice-based interaction, the action teaching apparatus comprising:

speech input means from which the content of a user's speech is input in audio form;

speech recognition means which recognizes the input speech as text information;

a keyword database which stores keywords including commands corresponding to basic actions, terms related to action registering, and commands corresponding to combined actions which consist of one or more basic actions performed in time-series order;

a combined-action database which stores the combined actions in association with the commands;

keyword extracting means which extracts a keyword from the text information recognized by the speech recognition means;

basic-action commanding means which, in response to the extraction by the keyword extracting means of one command corresponding to one basic action, commands the execution of the basic action;

combined-action commanding means which, in response to the extraction by the keyword extracting means of one command corresponding to one combined action, commands the execution of the combined action;

action executing means which, in response to one basic-action command or one combined-action command, executes an action corresponding thereto;

an action-record database which stores, in time-series order, a record of actions executed by the action executing means; and combined-action registering means which, in response to the extraction by the keyword extracting means of one term related to action registering, separates a portion of the action record from the action-record database in accordance with the extracted term, and which registers the extracted portion in the combined-action database and the keyword database, with a command assigned to the action record in accordance with the extracted term.

An action teaching apparatus for a robot apparatus, according to the second aspect of the present invention, includes a speech recognition function for converting audio information into text information, and a database retrieval function for extracting a keyword from the text information obtained by the conversion. By designating a plurality of basic actions on a speech basis, and storing an action record, the action teaching apparatus uses only voice-based interaction to enable naming, as a new action, a combined action formed by combining the plurality of basic actions in time-series order.

Accordingly, the user can designate complicated continuous actions by using only one word, and this facilitates conversation with the robot.

The present invention is, in a third aspect thereof, an action teaching method for teaching actions to a robot apparatus by voice-based interaction, the action teaching method comprising:

a speech input step in which the content of a user's speech is input in audio form;

a speech recognition step for recognizing the input speech as text information;

an action control step for moving a body in accordance with a recognized command;

an action-record storage step for storing an action record in which a plurality of action patterns are arranged in time-series order in accordance with the order of execution; and an action registering step for separating a portion of the action record therefrom, and registering the portion in the action database, with a command assigned to the portion.

The action teaching method for a robot apparatus, according to the third aspect of the present invention, has a speech recognition function for converting audio information into text information, and a database retrieval function for extracting a keyword from the text information obtained by the conversion. By designating a plurality of basic actions on a speech basis, and storing an action record, the action teaching method uses only voice-based interaction to enable naming, as a new action, a combined action formed by combining the plurality of basic actions in time-series order.

Accordingly, the user can designate complicated continuous actions by using only one word, and this facilitates conversation with the robot.

Here, in the action registering step, a new command may be set based on the content of the speech input by the user in the speech input step.

Also, in the action registering step, the portion of the action record may be separated by using, as a trigger, either a specific input such as a demonstrative pronoun or a pointer through the speech input means, or a state of rest.

When the robot apparatus can be autonomically driven, in the action registering step, in response to a user's instruction in the speech input step, the action record may be followed backward in time-series order and action separation may be performed.

In addition, the present invention is, in a fourth aspect thereof, an action teaching method for teaching actions to a robot apparatus by voice-based interaction, wherein:

the robot apparatus comprises:

a keyword database which stores keywords including commands corresponding to basic actions, terms related to action registering, and commands corresponding to combined actions which consist of one or more basic actions performed in time-series order;

a combined-action database which stores the combined actions in association with the commands;

an action-record database which stores, in time-series order, a record of actions executed by a body; and the method comprises:

a speech input step in which the content of a user's speech is input in audio form;

a speech recognition step for recognizing the input speech as text information;

a keyword extracting step for extracting a keyword from the text information recognized in the speech input step;

a basic-action commanding step for, in response to extraction in the keyword extracting step of one command corresponding to one basic action, commanding the execution of the basic action;

a combined-action commanding step for, in response to extraction in the keyword extracting step of one command corresponding to one combined action, commanding the execution of the combined action;

an action executing step for, in response to one basic action command or one combined action command, executing an action corresponding thereto; and a combined-action registering step for, in response to extraction in the keyword extracting step of one term related to action registering, separating a portion of the action record from the action-record database in accordance with the extracted term, and for registering the extracted portion in the combined-action database and the keyword database, with a command assigned to the action record in accordance with the extracted term.

The action teaching method for a robot apparatus, according to the fourth aspect of the present invention, has a speech recognition function for converting audio information into text information, and a database retrieval function for extracting a keyword from the text information obtained by the conversion. By designating a plurality of basic actions on a speech basis, and storing an action record, the action teaching method uses only voice-based interaction to enable naming, as a new action, a combined action formed by combining the plurality of basic actions in time-series order.

Accordingly, the user can designate complicated continuous actions by using only one word, and this facilitates conversation with the robot.

In addition, the present invention is, in a fifth aspect thereof, a storage medium physically storing computer software in a computer-readable form, the computer software controlling the execution in a computer system of an action teaching process for teaching actions to a robot apparatus by voice-based interaction, wherein:

the robot apparatus comprises:

a keyword database which stores keywords including commands corresponding to basic actions, terms related to action registering, and commands corresponding to combined actions which consist of one or more basic actions performed in time-series order;

a combined-action database which stores the combined actions in association with the commands; and an action-record database which stores, in time-series order, a record of actions executed by a body; and the computer software comprises:

a speech input step in which the content of a user's speech is input in audio form;

a speech recognition step for recognizing the input speech as text information;

a keyword extracting step for extracting a keyword from the text information recognized in the speech input step;

a basic-action commanding step for, in response to extraction in the keyword extracting step of one command corresponding to one basic action, commanding the execution of the basic action;

a combined-action commanding step for, in response to extraction in the keyword extracting step of one command corresponding to one combined action, commanding the execution of the combined action;

an action executing step for, in response to one basic action command or one combined action command, executing an action corresponding thereto; and a combined-action registering step for, in response to extraction in the keyword extracting step of one term related to action registering, separating a portion of the action record from the action-record database in accordance with the extracted term, and for registering the extracted portion in the combined-action database and the keyword database, with a command assigned to the action record in accordance with the extracted term.

The storage medium according to the fifth aspect of the present invention is, for example, a medium for providing, in a computer-readable form, computer software to a multipurpose computer system that can execute various program codes. Such a medium is, for example, a portable, removable storage medium such as a CD (Compact Disc), an FD (Flexible Disk), or an MO (Magneto-Optical disc). Alternatively, it is also technically possible to provide computer software to a specified computer system through a transmission medium such as a network (the network may be regardless of the distinction between wireless and wired types.

This type of storage medium defines cooperated relationship in structure or function between computer software and storage medium for implementing predetermined computer software in a computer system. In other words, by using the storage medium according to the fifth aspect of the present invention to install the predetermined computer software into the computer system, the computer system has cooperated operation and can obtain operation and effect similar to those in the action teaching method for the robot apparatus according to the fourth aspect of the present invention.

Other objects, features, and advantages of the present invention become apparent by a more detailed description based on the following embodiment of the present invention and the accompanying drawings.

BRIEF DESCRIPTION OF THE DRAWINGS

FIG. 7 is an illustration of an example of an action-record database 107.

FIG. 8 is an illustration of examples of combined actions recorded in a combined-action database 106.

BEST MODE FOR CARRYING OUT THE INVENTION

An action teaching method according to the present invention can be applied not only walking robot apparatuses, but also to all action systems which have voice-based recognition functions and in which, from among preprogrammed basic actions, a specific action is commanded on a speech basis, such as other types of articulated robots, and animations using characters which perform actions by computer graphics (CG). In the following, an embodiment of the present invention is described with reference to the drawings by using an example of an animal (pet) robot in which a basic action can be autonomically selected.

Figure 1:
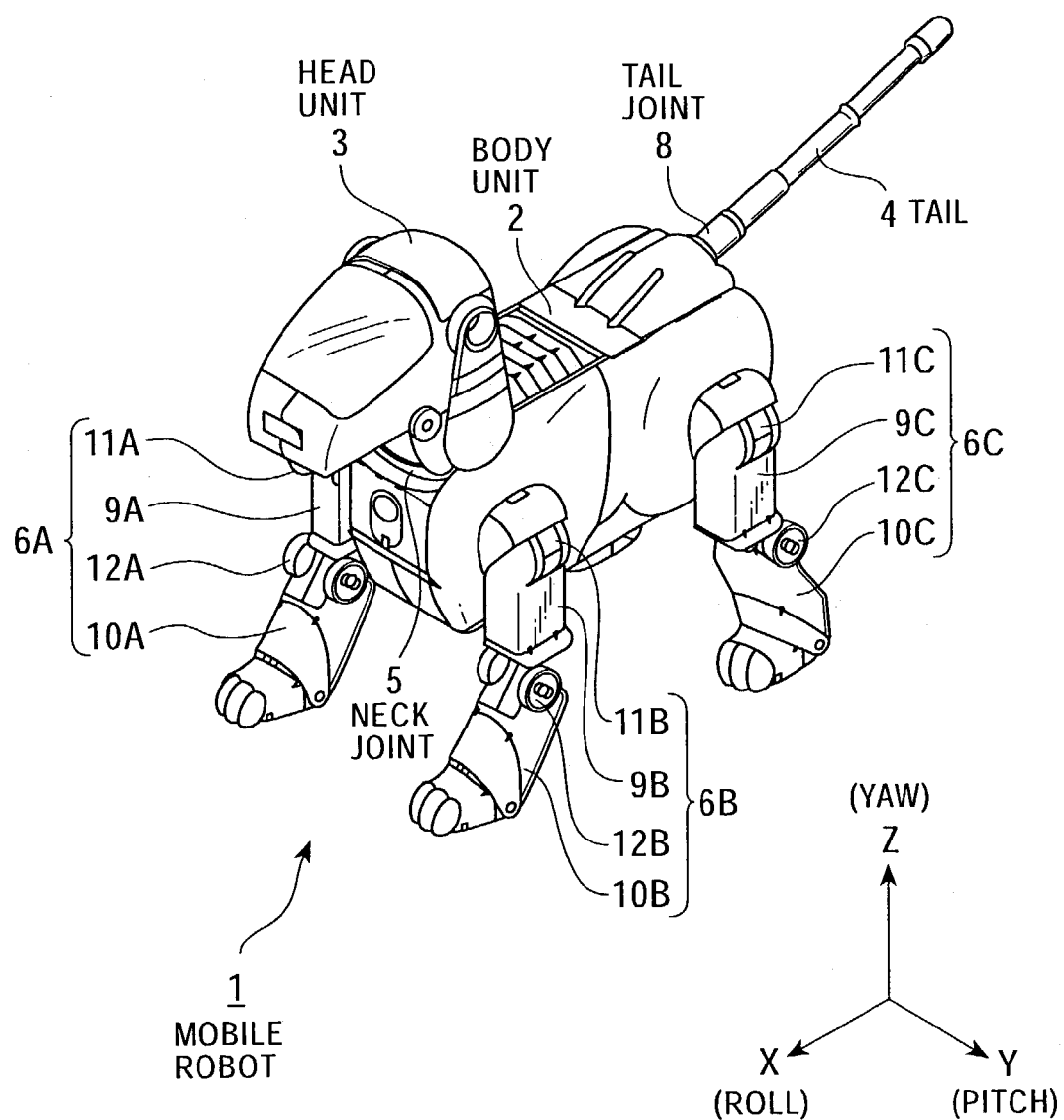
FIG. 1 is an illustration of the exterior of a mobile robot 1 performing four-legged walking in which the present invention is practiced.

FIG. 1 shows the exterior view of a mobile robot 1 that performs legged walking using four legs. As shown in this figure, the mobile robot 1 is an articulated mobile robot modeled on the shape and structure of an animal having four legs. In particular, the mobile robot 1 in this embodiment has an aspect of a pet robot that is designed imitating the shape and structure of a dog that is typical of a pet animal. For example, it coexists with a human under human residential environments, and can express actions in response to user's operations.

The mobile robot 1 includes a body unit 2, a head unit 3, a tail 4, and four legs, namely, leg units 6A to 6D.

The body unit 2 accommodates a control unit (described later and not shown in FIG. 1) for performing overall control of body actions, and a battery (not shown in FIG. 1) that is a main power supply for the body.

The head unit 3 is joined to the substantially top-front end of the body unit 2 by a neck unit 7 having degrees of freedom in axial directions (shown in the figure) of a roll, a pitch, and a yaw. Also, the head unit 3 includes a picture recognition unit 15 such as a CCD (Charge Coupled Device) camera corresponding to the "eyes" of the dog, a microphone 16 corresponding to the "ears", a speaker 17 corresponding to the "mouth", a touch sensor 18 corresponding to tactile impression, a plurality of LED indicators 19, and a remote-controller receiving unit 20 that receives a command transmitted through a remote controller (not shown) from a user. Sensors that form the five senses of a living body may be included other than these.

The tail 4 is joined to the substantially top-rear end of the body unit 2 so as to curve or swing by a tail joint 8 having degrees of freedom in roll and pitch axes.

The leg units 6A and 6B constitute front legs, and the leg units 6C and 6D constitute rear legs. The leg units 6A to 6D are formed by combinations of femoral units 9A to 9D and shank units 10A to 10D, and are joined to the bottom surface of the body unit 2 in its front, rear, right, and left corners. The femoral units 9A to 9D are joined to predetermined regions of the body unit 2 by hip joints 11A to 11D having degrees of freedom on the axes of a roll, a pitch, and a yaw. The femoral units 9A to 9D and the shank units 10A to 10D are joined by knee joints 12A to 12D having degrees of freedom on roll and pitch axes, which are provided therebetween.

The legged mobile robot 1 having the shown structure can vertically or horizontally swing, and can wag the tail 4 by driving each of joint actuators in response to commands from a control unit, which is described later. By performing synchronously coordinated driving of the leg units 6A to 6D, actions such as walking and running can be realized.

The degree of freedom of each joint in the mobile robot 1 is provided by the rotational driving of a joint actuator (not shown in FIG. 1) actually provided for each axis. The number of degrees of freedom of the legged mobile robot 1 is arbitrary and does not limit the gist of the present invention.

Figure 2:
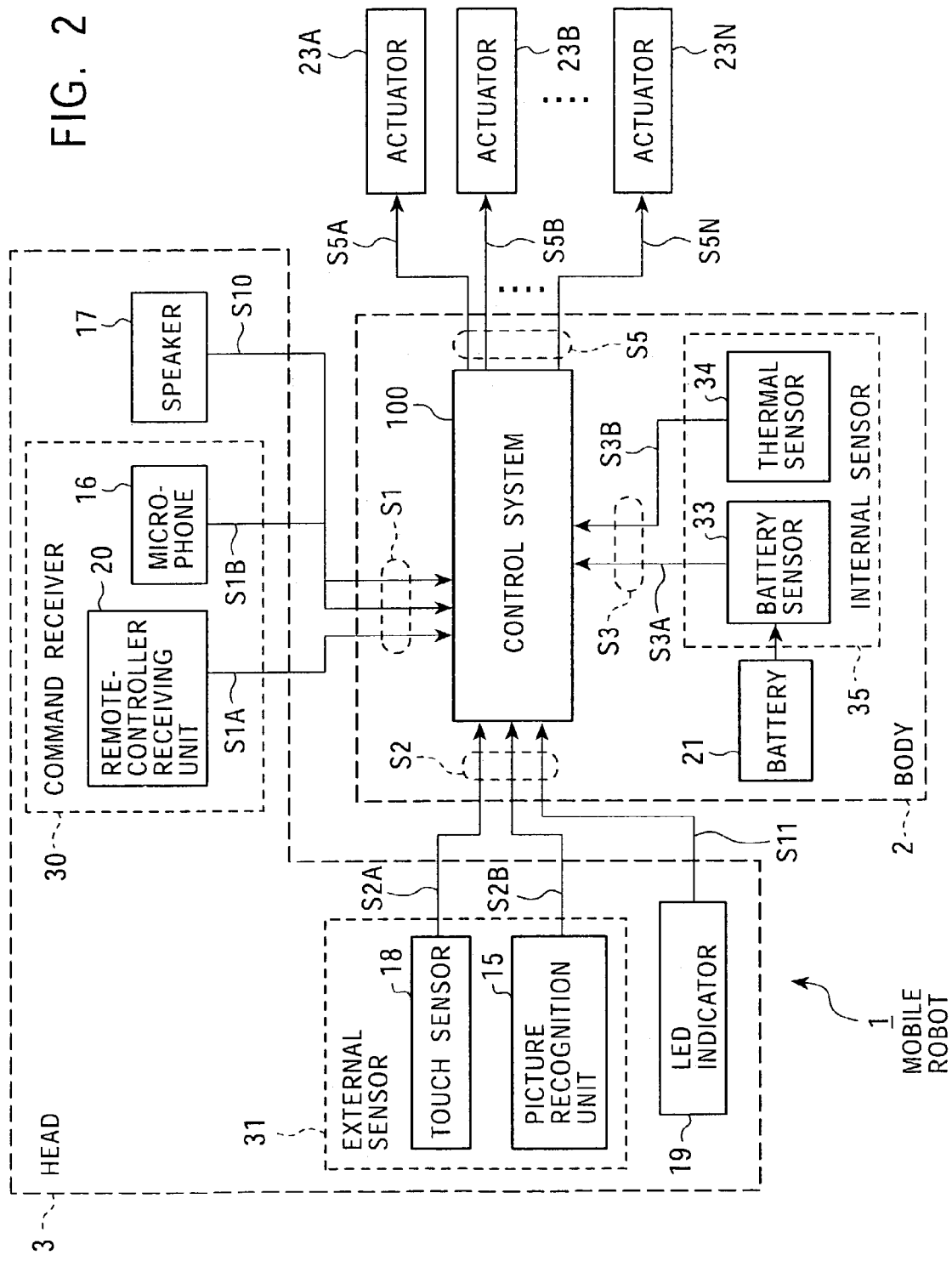
FIG. 2 is a schematic block diagram showing the hardware structure of a control unit that controls action of the mobile robot 1.

FIG. 2 shows the schematic structure of hardware of the control unit that controls the action of the mobile robot 1.

The head 3 includes a command receiver 30 composed of the microphone 16 and the remote-controller receiving unit 20, an external sensor 31 composed of the picture recognition unit 15 and the touch sensor 18, the speaker 17, and the LED indicator 19.

In addition, the body 2 accommodates a battery 21 as a main power supply, and includes an internal sensor 35 composed of a battery sensor 33 for detecting the remaining capacity of the battery 21, a thermal sensor 34 for detecting heat which is generated inside the body, and a control system 100 that performs overall control of the entire operation of the mobile robot 1.

A plurality of actuators 23A to 23N are provided in portions (e.g., driving joint portions) of the mobile robot 1.

The command receiver 30 includes the remote-controller receiving unit 20 and the microphone 16, and can receive commands which are given from the user to the mobile robot 1, for example, commands such as "WALK", "DOWN", and "FOLLOW THE BALL".

The remote-controller receiving unit 20 generates a received signal S1A by receiving a command which is input to a remote controller (not shown) by a user's operation, and sends the signal to the control system 100. For example, a command from the remote controller is transferred by using a technology such as close-range wireless data communication such as infrared data communication (IrDA), Bluetooth, or IEEE 802.11B.

When the user speaks in accordance with the desired command, the microphone 16 generates an audio signal S1B by receiving the speech, and sends the signal to the control system 100.

The touch sensor 18 in the external sensor 31 detects influences of the user on the mobile robot 1, for example, influences such as "STROKING" and "PATTING". For example, when the user touches the touch sensor 18 and the desired influence is made, a touch-detected signal S2A is generated and sent to the control system 100.

By recognizing the surrounding environments of the mobile robot 1, the picture recognition unit 15 in the external sensor 31 detects surrounding-environment information such as, for example, "DARK" and "A FAVORITE TOY CAN BE SEEN", or detects a motion of another mobile robot, that is, information such as "ANOTHER ROBOT IS RUNNING". The picture recognition unit 15 sends, to the control system 100, a picture signal S2B obtained by capturing a surrounding picture.

The internal sensor 35 is for detecting internal states such as, for example, "HUNGRY" and "HAVING A FEVER", which means that the battery capacity has decreased, and includes the battery sensor 33 and the thermal sensor 34.

The battery sensor 33 detects the remaining capacity of the battery as the main power supply of the body, and sends the resultant battery-capacity-detected signal S3A to the control system 100. The thermal sensor 34 detects the heat of the body inside, and sends the resultant heat-detected signal S3B to the control system 100.

Based on command signals S1 supplied from the command receiver 30, external information signals S2 supplied from the external sensor 31, and internal information signals S3 supplied from the internal sensor 35, the control system 100 generates control signals S5A to S5N for driving the actuators 23A to 23N, and sends these to the actuators 23A to 23N, respectively, whereby overall control of the body action is performed.

The control system 100 generates an audio signal S10 and a light-emitting signal S11 which are for external outputs, if needed. Between them, the audio signal S10 is output from the speaker 17 to the exterior, and the light-emitting signal S11 is sent to the LED indicator 19 so that the desired light-emitting-form outputting (e.g., blinking or color changing) is performed, whereby information such as the internal state of the body can be fed back to the user. For example, light-emitting-form outputting enables the user to knew the robot's feeling. Instead of the LED indicator 19, a picture display unit (not shown) for displaying a picture may be included. This can display, on the desired displayed picture, more accurate and detailed information such as the robot's feeling for the user.

The control system 100 can have interaction with the user on a speech basis, and, when a specific command is spoken, controls the body so that the corresponding specific action can be shown. The control system 100 according to this embodiment provides a speech-based action teaching mechanism. In other words, only by speech-based interaction, a plurality of basic actions to which commands are assigned are combined in time-series order to form a combined action, and this combined action is regarded as a new action and can be named (i.e., a new command can be assigned).

According to this action teaching mechanism, it is easy for the user to have a conversation for ordering the mobile robot 1. Also, since only one word can designate complicated continuous actions, the operability of the mobile robot 1 can be greatly increased. In addition, only a speech can teach the mobile robot 1 to perform actions, so that even an ordinary user having no knowledge about the computer can teach actions to the mobile robot 1.

Next, the action teaching mechanism of the mobile robot 1 by the control system 100 is described.

Figure 3:
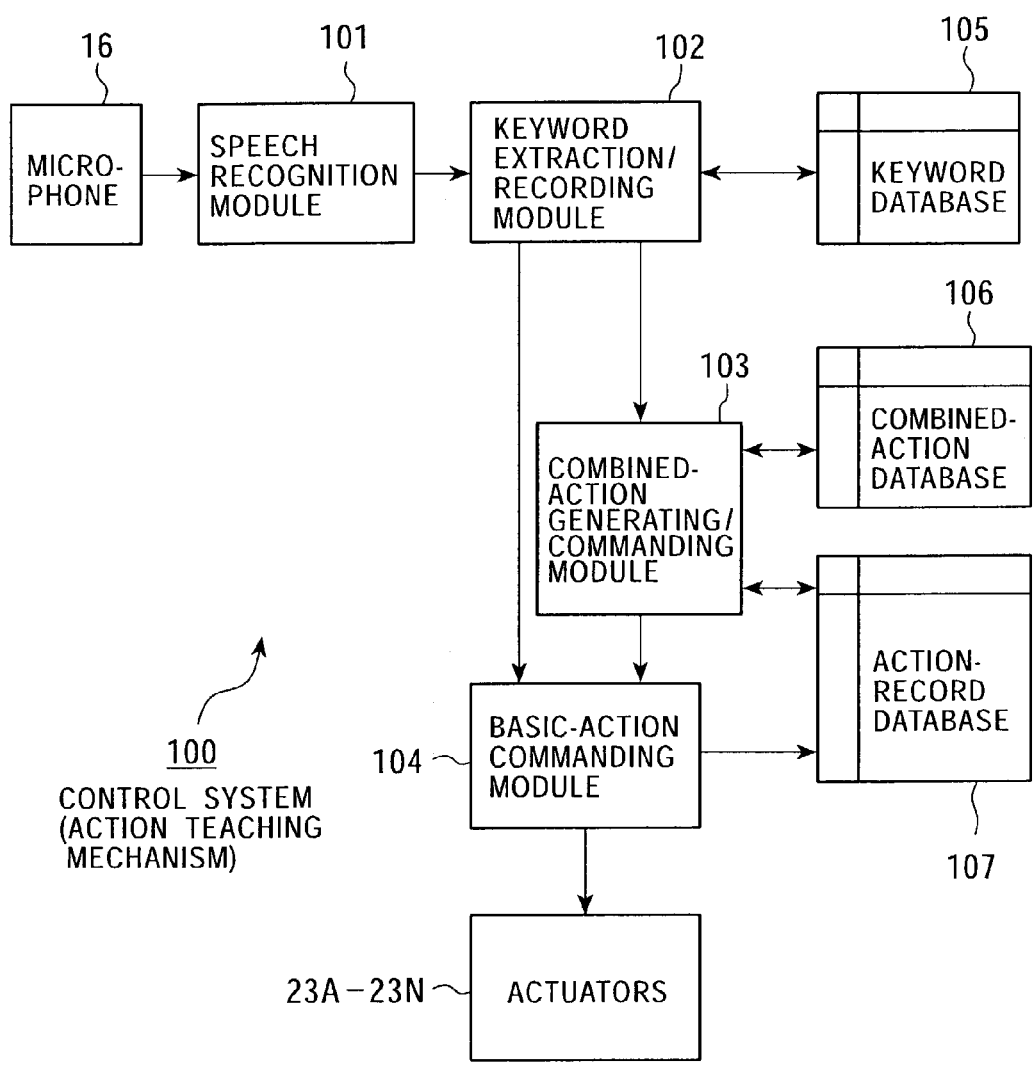
FIG. 3 is a schematic block diagram showing the functional structure of an action teaching mechanism provided by a control system 100.

FIG. 3 shows the schematic functional structure of the action teaching mechanism provided by the control system 100. As shown in this figure, the action teaching mechanism includes a speech recognition module 101, a keyword extraction/recording module 102, a basic-action commanding module 103, a combined-action generating/commanding module 104, a keyword database 105, a combined-action database 106, and an action-record database 107. The modules are described below.

The speech recognition module 101 replaces the audio signal received and input by the microphone 16 with text information, and outputs the text information. For speech recognition, an algorithm such as, for example, the "HMM (Hidden Markov Model)" can be used. In the Hidden Markov Model, a temporal change in phonemes or a characteristic in a word is represented by several states, and a transition between the states and the condition of spectrum characteristic amounts in the states are expressed as a probability model. Since the Hidden Markov Model handles changes in the audio signal in the form of probabilities, it can preferably express a fluctuation in input speech, compared with the DP (Dynamic Programming) matching method.

Alternative functions to the speech recognition unit 101 include, for example, character-information inputting by using a user input device such as a keyboard or a mouse, character-information transfer by using a network or a remote controller.

The keyword extraction/recording module 102 includes a sub-module that extracts, from the keyword database 105, a keyword matching input text information, and a sub-module that registers combined actions.

Figure 4:
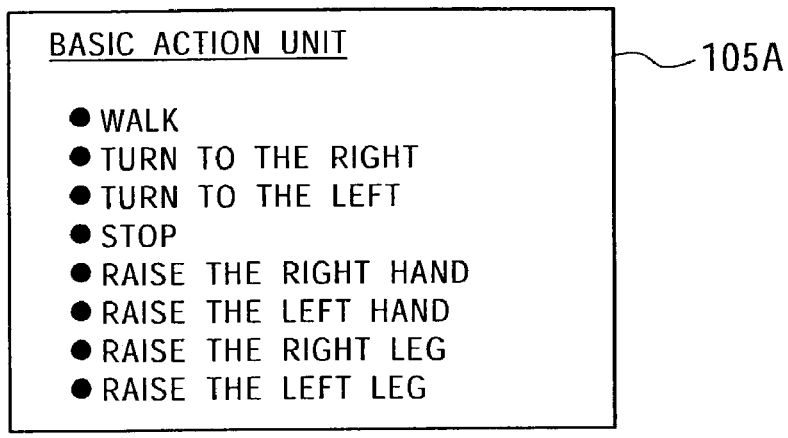
FIG. 4 is an illustration of an example of a basic action unit 105A in a keyword database 105.
Figure 5:
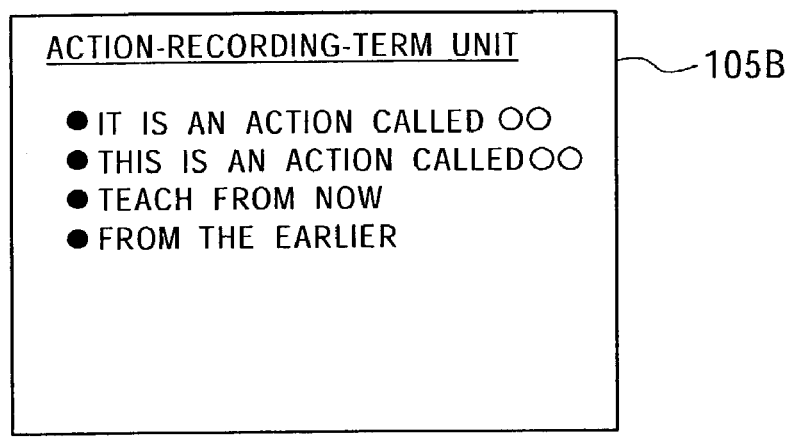
FIG. 5 is an illustration of an example of an action-recording term 105B in the keyword database 105.
Figure 6:
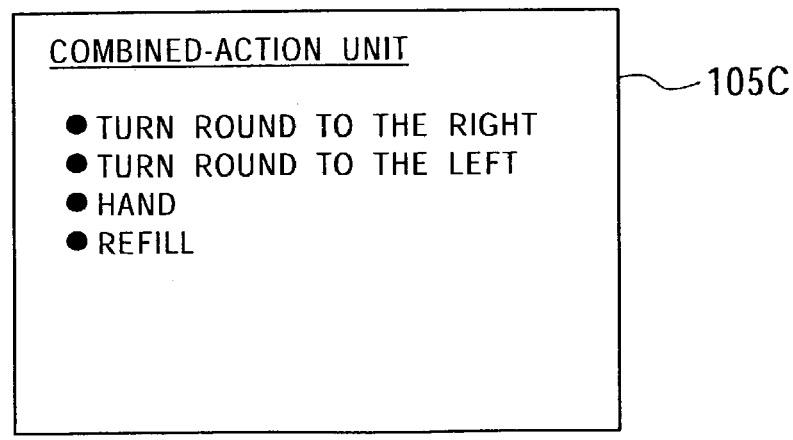
FIG. 6 is an illustration of an example of a combined-action unit 105C in the keyword database 105.

The keyword database 105 is a functional module for managing, in the form of a database, keywords which are used as commands in the control system 100, and in this embodiment, the keywords are broadly divided and stored in a basic action unit 105A, an action-recording-term unit 105B, and a combined-action unit 105C. Examples of the basic action unit 105A, the action-recording-term unit 105B, and the combined-action unit 105C are shown in FIG. 4 to FIG. 6, respectively.

Here, when a keyword in the basic action unit 105A is extracted, the corresponding action is requested from the basic-action commanding module 104. When a keyword in the action-recording-term unit 105B is extracted, based on a predetermined algorithm (described later), it is recorded in a keyword database (the combined-action database 105C) and the combined-action database 106. When a keyword in the combined-action unit 105C is extracted, the corresponding combined action is requested from the combined-action generating/commanding module 103.

The combined-action generating/commanding module 103 includes a sub-module that commands the basic-action commanding module 104 to execute a combined action recorded in the combined-action database 106, and a sub-module that records a combined action in accordance with a predetermined processing procedure (described later).

The basic-action commanding module 104 reads a program corresponding to a commanded action, and issues a driving command to each of the actuators 23A to 23N, etc. The basic-action commanding module 104 also records an action record about issued driving commands, etc., in the action-record database 107. FIG. 7 shows an example of the action-record database 107.

A combined action is formed by combining in time-series order a plurality of basic actions and already recorded combined actions. In this embodiment, a combined action is described as time-series data of basic actions that are separated from the action-record database 107 having a record form as shown in FIG. 7, and are recorded in the combined-action database 106. FIG. 8 shows examples of combined actions recorded in the combined-action database 106.

A problem in this case is how to separate the desired time-series data from the action-record database 107.

In one method for separating the time-series data, it is possible that the start and end of a combined action to be separated from the action-record database 107 be designated by a user's input with speech or with some hardware such as a controller. In a method for this designation on a speech basis, it is possible that, before action teaching, the start be designated by keywords such as "TEACH FROM NOW", and it is possible that, at the same time, the end be designated by an instruction such as "IT/THIS IS AN ACTION CALLED ○○" and be named (provision of an instruction).

In another method, by extracting a state of rest from the action-record database 107, and displaying changes from the state of rest as possible start points, the need to designate the start point by speech is eliminated. In this case, the user needs to select a possible start point.

At first, by backward scanning the action-record database 107 from the end point to the past, and using a change from the first state of rest as a first possible start point, the mobile robot 1 plays back a combined action from there to the end point. Here, when the user requests selection of another start point by speaking the keywords "FROM THE EARLIER", the mobile robot 1 further scans the action-record database 107 backward, selects a change from the next state of rest as a possible start point, and plays back a combined action from there to the end point again.

By repeatedly performing the operation of selecting the start point and playing back the combined action, as described above, until the user uses the instruction "THAT's OK" to indicate that the start point is accurately selected, determination of the start point and recording of the combined action can be performed.

Figure 9:
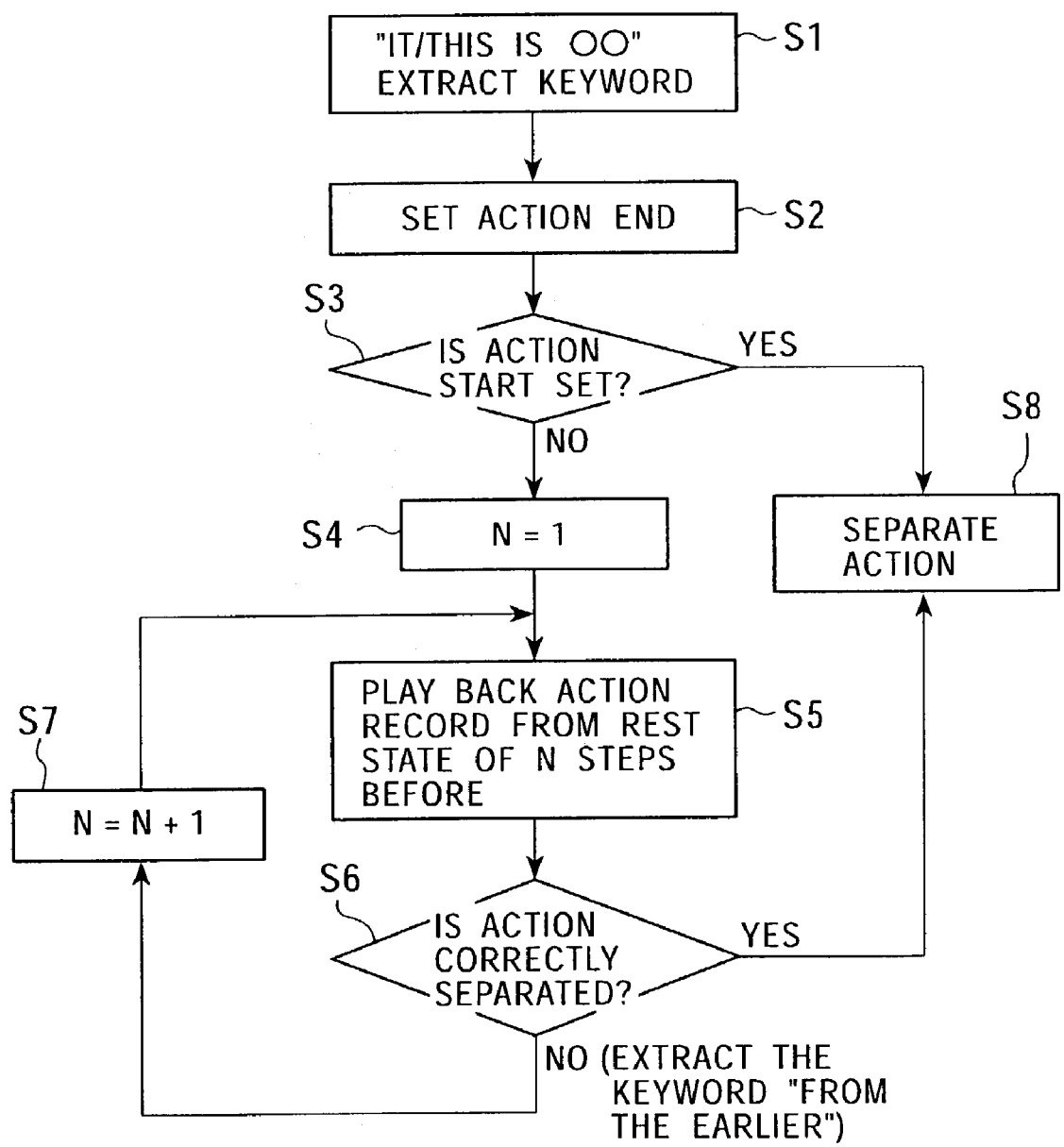
FIG. 9 is a flowchart showing an action teaching algorithm in which, on a speech basis, a start is determined and a combined action is recorded.

FIG. 9 shows, in the form of a flowchart, an action teaching algorithm for performing the determination of the start point and the recording of the combined action on a speech basis. The action teaching process is described below in accordance with this flowchart.

When the keywords "IT/THIS IS AN ACTION CALLED ○○" are extracted from the keyword extraction/recording module 102 (step S1), the recording process of a combined action called ○○ is initiated, and the time the keywords are spoken is set as the end point of the combined action (step S2).

Next, checking about whether or the start point of the action is set is performed (step S3).

When the start point of the combined action has already been designated by the keywords "COUNT FROM NOW" or the like, setting of an action separating point is completed. Thus, separated time-series data is recorded with it named ○○ as a combined action name (i.e., an instruction), and this combined action name is recorded in the combined-action unit 105C in the keyword database 105 (step S8).

Also, when the start point of the time-series action has not been set, variable N is set to an initial value of 1 (step S4), the first state of rest is retrieved by backward scanning the action-record database 107 from the present time, and the time-series actions are played back from a change from a state of rest which is retrieved in the N-th time (step S5).

After the playback, when the keywords "THAT's OK" are extracted from an instruction spoken by the user (step S6), the time-series actions played back by the above method are recorded as a combined action (step S8).

When the keywords "FROM THE EARLIER" from the instruction spoken by the user (step S6), N is incremented by 1 (step S7), a state of rest is retrieved by further performing backward scanning of the action-record database 107, and time-series data is played back from a change from a state of rest which is retrieved in the N-th time (step S5).

Until the keywords "THAT's OK" are extracted from the instruction by the user, similar processing is repeatedly executed while scanning the action-record database 107. As a result, a change from an arbitrary state of rest is selected as the start point of a combined action, and time-series actions between the start point and the end point are separated as a combined action and can be recorded with the desired action name.

In the following, a specific example of recording a combined action by interaction is described.

It is assumed that actions such as "to walk", "to turn (to the right or left)", and "to stop" are preprogrammed as basic actions that can be selected by the mobile robot 1, and are recorded as imperative forms such as "WALK" in the basic action unit 105A in the keyword database 105, as shown in FIG. 4.

Here, when the user gives a command with "WALK" from the microphone 16, it is recognized and replaced with text information by the speech recognition module 102, and database retrieval by the keyword extraction/recording module 102 is performed. An action request corresponding to the command is sent to the basic-action commanding module 104.

By consecutively giving, for example, the commands "WALK→TURN TO THE RIGHT→TURN TO THE RIGHT→TURN TO THE LEFT→STOP" with appropriate timing, as described above, the mobile robot 1 can be controlled to perform an action of turning in the right direction.

When the user wishes for it to perform this combined action again, the user must similarly speak a plurality of commands with similar timing.

According to the action teaching mechanism according to this embodiment, by giving the name "TURN ROUND TO THE RIGHT" (giving a command) to the continuous time-series actions "WALK→TURN TO THE RIGHT→TURN TO THE RIGHT→TURN TO THE LEFT→STOP", and recording the actions in the combined-action database 106, only one command, "TURN ROUND TO THE RIGHT", is used thereafter to designate the same combined action.

Moreover, in the case of a robot apparatus or the like that can act autonomically, it autonomically performs various combinations of actions without being directed by the user. Accordingly, when the robot performs a favorite combined action, by giving from the user the instruction "IT IS AN ACTION CALLED ○○", the action pattern can be named and stored. Also, for determination of the start point in this case, similarly to the description with reference to FIG. 9, the method for extracting possible start points from states of rest in the action-record database 107 can be used.

In addition, actions recorded as a combined action may be formed by only one basic action. This case is a type of alias recording, and the user can record a command by using a user-friendly word. For example, when a basic action called "RAISE THE RIGHT HAND" has already been recorded, it can be named "HAND". Accordingly, commands unique to the user, or space for commanding the robot or the like can be created.

Supplement

The present invention has been fully described with a specific embodiment thereof. However, it is obvious that a person skilled in the art can modify and substitute the embodiment without departing the gist of the present invention.

In the present Specification, an embodiment in which the present invention is applied to a pet robot has been mainly described, but the gist of the present invention is not always limited to a product called a "robot". In other words, the present invention can be similarly applied to, for example, even a product belonging to another industrial field, such as a toy, if the product is a mechanical apparatus that performs movements imitating actions of the human by using electric or magnetic operation. Also, the present invention can be applied to an animation or the like which uses a character performing actions by computer graphics (CG).

In short, the present invention has been disclosed in the form of exemplification and should not be interpreted in a limited form. To determine the gist of the present invention, the initially described column of Claims should be considered.

INDUSTRIAL APPLICABILITY

According to the present invention, a superior robot apparatus that can execute a specific action in response to a specific spoken command, and a control method therefor can be provided.

Also, according to the present invention, an action teaching apparatus and action teaching method for a superior robot apparatus that, by voice-based interaction, can execute a combined action formed by combining in time-series order a plurality of actions to which commands are assigned, and a storage medium can be provided.

Also, according to the present invention, an action teaching apparatus and action teaching method for a superior robot apparatus in which a combined action formed by combining in time-series order a plurality of basic actions can be regarded as a new action and named, and a storage medium can be provided.

According to a robot apparatus and its control method according to the present invention, by newly naming a combined action formed by combining in time-series order a plurality of basic actions, speaking such as ordering from the human to the robot is facilitated.

Also, since the user can designate complicated continuous actions by using one word, the operability of the robot apparatus can be greatly increased.

Also, even an ordinary user can teach an action to the robot apparatus only by speech. In other words, since computer-related knowledge is not necessary for teaching actions to the robot apparatus, the operability can be improved and the range of users can be expanded.

Also, the user can perform speech commanding of actions by using user's favorite words, so that the operability can be improved and increased familiarity with the robot apparatus can enhance entertainment.

The invention claimed is:

1. An action teaching apparatus for teaching actions to a robot apparatus by voice-based interaction, comprising:
   speech input means from which the content of a user's speech is input in audio form;
   speech recognition means which recognizes the input speech as text information;
   action control means which moves a body in accordance with a recognized command;
   an action database which stores action patterns in association with commands;
   action-record storage means which stores an action record in which a plurality of action patterns are arranged in time-series order in accordance with the order of execution; and
   action registering means which separates a portion of the action record therefrom, and registers the portion in said action database, with a new command assigned to the portion.

2. An action teaching apparatus for a robot apparatus, according to claim 1,
   wherein, based on the content of the speech input through said speech input means by the user, said action registering means sets the new command.

3. An action teaching apparatus for a robot apparatus, according to claim 1,
   wherein said action registering means separates the portion of the action record by using, as a trigger, either a specific input such as a demonstrative pronoun or a pointer through said speech input means, or a state of rest.

4. An action teaching apparatus for a robot apparatus, according to claim 1,
   wherein: said robot apparatus can be autonomically driven; and in response to a user's instruction through said speech input means, said action registering means follows the action record backward in time-series order and performs action separation.

5. An action teaching apparatus for teaching actions to a robot apparatus by voice-based interaction, comprising:
   speech input means from which the content of a user's speech is input in audio form;
   speech recognition means which recognizes the input speech as text information;
   a keyword database which stores keywords including commands corresponding to basic actions, terms related to action registering, and commands corresponding to combined actions which consist of one or more basic actions performed in time-series order;
   a combined-action database which stores the combined actions in association with the commands;
   keyword extracting means which extracts a keyword from the text information recognized by said speech recognition means;
   basic-action commanding means which, in response to the extraction by said keyword extracting means of one command corresponding to one basic action, commands the execution of the basic action;
   combined-action commanding means which, in response to the extraction by said keyword extracting means of one command corresponding to one combined action, commands the execution of the combined action; action executing means which, in response to one basic-action command or one combined-action command, executes an action corresponding thereto;
   an action-record database which stores, in time-series order, a record of actions executed by said action executing means; and
   combined-action registering means which, in response to the extraction by said keyword extracting means of one term related to action registering, separates a portion of the action record from said action-record database in accordance with the extracted term, and which registers the extracted portion in said combined-action database and said keyword database, with a command assigned to the action record in accordance with the extracted term.

6. An action teaching method for teaching actions to a robot apparatus by voice-based interaction, comprising:
   a speech input step in which the content of a user's speech is input in audio form; a speech recognition step for recognizing the input speech as text information;
   an action control step for moving a body in accordance with a recognized command;
   an action-record storage step for storing an action record in which a plurality of action patterns are arranged in time-series order in accordance with the order of execution; and
   an action registering step for separating a portion of the action record therefrom, and registering the portion in said action database, with a command assigned to the portion.

7. An action teaching method for a robot apparatus, according to claim 6, wherein, in said action registering step, a new command is set based on the content of the speech input by the user in said speech input step.

8. An action teaching method for a robot apparatus, according to claim 6, wherein, in said action registering step, the portion of the action record is separated by using, as a trigger, either a specific input such as a demonstrative pronoun or a pointer through said speech input means, or a state of rest.

9. An action teaching method for a robot apparatus, according to claim 6, wherein: said robot apparatus can be autonomically driven; and in said action registering step, in response to a user's instruction in said speech input step, the action record is followed backward in time-series order and action separation is performed.

10. An action teaching method for teaching actions to a robot apparatus by voice-based interaction, wherein: said robot apparatus comprises:

a keyword database which stores keywords including commands corresponding to basic actions, terms related to action registering, and commands corresponding to combined actions which consist of one or more basic actions performed in time-series order;

a combined-action database which stores the combined actions in association with the commands;

an action-record database which stores, in time-series order, a record of actions executed by a body; and the method comprises:

a speech input step in which the content of a user's speech is input in audio form;

a speech recognition step for recognizing the input speech as text information;

a keyword extracting step for extracting a keyword from the text information recognized in said speech input step;

a basic-action commanding step for, in response to extraction in said keyword extracting step of one command corresponding to one basic action, commanding the execution of the basic action;

a combined-action commanding step for, in response to extraction in said keyword extracting step of one command corresponding to one combined action, commanding the execution of the combined action;

an action executing step for, in response to one basic action command or one combined action command, executing an action corresponding thereto; and a combined-action registering step for, in response to extraction in said keyword extracting step of one term related to action registering,-separating a portion of the action record from said action-record database in accordance with the extracted term, and for registering the extracted portion in said combined-action database and said keyword database, with a command assigned to the action record in accordance with the extracted term.

11. A storage medium physically storing computer software in a computer-readable form, the computer software controlling the execution in a computer system of an action teaching process for teaching actions to a robot apparatus by voice-based interaction, wherein: said robot apparatus comprises:

a keyword database which stores keywords including commands corresponding to basic actions, terms related to action registering, and commands corresponding to combined actions which consist of one or more basic actions performed in time-series order;

a combined-action database which stores the combined actions in association with the commands; and an action-record database which stores, in time-series order, a record of actions executed by a body; and the computer software comprises:

a speech input step in which the content of a user's speech is input in audio form;

a speech recognition step for recognizing the input speech as text information;

a keyword extracting step for extracting a keyword from the text information recognized in said speech input step;

a basic-action commanding step for, in response to extraction in said keyword extracting step of one command corresponding to one basic action, commanding the execution of the basic action;

a combined-action commanding step for, in response to extraction in said keyword extracting step of one command corresponding to one combined action, commanding the execution of the combined action;

an action executing step for, in response to one basic action command or one combined action command, executing an action corresponding thereto; and a combined-action registering step for, in response to extraction in said keyword extracting step of one term related to action registering,-separating a portion of the action record from said action-record database in accordance with the extracted term, and for registering the extracted portion in said combined-action database and said keyword database, with a command assigned to the action record in accordance with the extracted term.

* * * * *